(12) United States Patent
Ishito et al.

(10) Patent No.: US 6,381,412 B1
(45) Date of Patent: Apr. 30, 2002

(54) CAMERA

(75) Inventors: Fumiaki Ishito; Akira Funahashi, both of Sakai (JP)

(73) Assignee: Minolta Co., Ltd., Osaka (JP)

( * ) Notice: Subject to any disclaimer, the term of this patent is extended or adjusted under 35 U.S.C. 154(b) by 73 days.

(21) Appl. No.: 09/629,614

(22) Filed: Jul. 31, 2000

(30) Foreign Application Priority Data

Aug. 5, 1999 (JP) ............................. 11-221871

(51) Int. Cl.$^7$ .......................... G03B 5/00; G03B 13/10; G03B 17/24
(52) U.S. Cl. ............................. 396/60; 396/84; 396/379
(58) Field of Search ........................... 396/60, 84, 379, 396/380, 378

(56) References Cited

U.S. PATENT DOCUMENTS

| | | | |
|---|---|---|---|
| 4,583,831 A | * 4/1986 | Harvey .................. | 396/60 |
| 5,606,383 A | 2/1997 | Daitoku et al. .............. | 396/60 |
| 5,848,302 A | * 12/1998 | Machida ..................... | 396/60 |
| 6,130,994 A | * 10/2000 | Maruyama .................. | 396/60 |

FOREIGN PATENT DOCUMENTS

JP          5-61093         12/1993 ............ G03B/5/00

* cited by examiner

*Primary Examiner*—W. B. Perkey
(74) *Attorney, Agent, or Firm*—Morrison & Foerster LLP

(57) ABSTRACT

A camera capable of switching two kinds of photographing modes, the normal photographing mode and the trimming-photographing mode capable of telephotographing in pseudo, and switching the photographing mode in an arbitrary position. A viewfinder cam for changing the focal length of a viewfinder optical system to confirm the range of an image plane to be printed through the viewfinder includes two cam faces corresponding to the photographing modes. When the cam face to be used is selected according to the photographing mode, a pin for changing the focal length of the viewfinder optical system interlocking with the zooming operation of the photographing lens is moved along the selected cam face, whereby the focal length of the viewfinder optical system is changed so that the angle of view of the viewfinder coincides with the angle of view of a photograph to be printed.

14 Claims, 10 Drawing Sheets

CAMERA

This application is based on application No. 11-221871 filed in Japan, the contents of which are hereby incorporated by reference.

BACKGROUND OF THE INVENTION

1. Field of the Invention

This invention relates to a camera and particularly to the camera capable of producing a trimming photographing image being scheduled for printing a part of photographic image in a subsequent printing process. The trimming photographing means taking a picture on the condition that in the print processing after photographing, a portion of an image is subjected to trimming, and this is a photographing technique such that in photographing, an image is recorded in a film and information for instructing to trim is also recorded. In the specification of the invention, this photographing technique is called trimming photographing.

2. Prior Art

In a camera using a zoom lens as a photographing lens, generally the camera includes a zoom viewfinder for varying the focal length of a viewfinder lens interlocking with the zooming operation to make the angle of view of the photographing lens coincide with the angle of view of the viewfinder.

With such a camera, in normal photographing, the range of a field of view confirmed through the viewfinder is photographed, so it is not a special obstacle to photographing.

Further, it is known that a trimming photographing camera is capable of obtaining a picture having a pseudo telephotographic effect as if it is photographed by a telephoto lens by trimming the top and bottom and left and right of a photographed image plane. This camera is adapted to trim the top and bottom and left and right of a photographed image plane in printing according to the trimming information preset in photographing and enlarge the image plane to be printed, thereby obtaining a photo having a pseudo telephotographic effect.

In the case of trimming photographing, since the angle of view of the finally obtained photo and the angle of view of the viewfinder do not coincide, it is necessary that only the angle of view of the viewfinder is changed to the angle of view of telephotographing to make the range of a field of view of the viewfinder match the image range of a photo obtained by trimming photographing, so that the range to be trimming photographed can be confirmed through the viewfinder.

Therefore, it has been proposed that in the zoom lens type camera capable of trimming photographing, at the time of trimming photographing, a converter lens is inserted in a viewfinder optical system to change the angle of view of the viewfinder only to the angle of view of pseudo telephotographing (See U.S. Pat. No. 5,606,383).

In addition to this, it has been proposed that the focal length of an objective lens of the viewfinder optical system is changed to change the angle of view of the viewfinder only (See Japanese Patent Laid-Open No. Hei 5-61093).

In the constitution in which the angle of view of a viewfinder is changed to the angle of view of telephotographing in trimming photographing, insertion of the converter lens in the viewfinder optical system is disadvantageous in that it is necessary to provide a space and a special driving mechanism for inserting and separating the converter lens in and from the interior of the viewfinder, so that the camera becomes bulky.

On the other hand, in the configuration where the focal length of the objective lens in the viewfinder optical system is changed, there is provided a structure of moving the objective lens of the viewfinder optical system by a viewfinder cam driven interlocking with rotation of the zoom ring of the photographing lens to change the focal length of the objective lens.

The viewfinder cam is provided with two kinds of cam grooves, a cam groove used in the case of photographing in the normal mode and a cam groove used in the case of photographing in the trimming mode, whereby in the case of switching from the normal mode to the trimming mode or switching inversely, that is, switching the photographing mode, one of the cam grooves suitable to the photographing mode is selected to move the objective lens of the viewfinder optical system.

However, switching to one of the cam grooves suitable to the photographing mode can not be performed in the middle position of the maximum or minimum focal length of the objective lens of the viewfinder optical system structurally, but switching between the cam grooves can be performed in the position of the maximum or minimum focal length of the objective lens, that is, only at the ends of the cam grooves.

Therefore, the disadvantage is that every time the photographing mode is switched, the zoom ring of the photographing lens is operated to set the focal length of the photographing lens to the maximum or minimum value, that is, to set the photographing lens to the limit position on the telephoto side or the wide angle side, and the viewfinder cam interlocking with the zoom ring should be moved to locate an engagement pin for driving the objective lens of the finder optical system at the end of the cam groove.

SUMMARY OF THE INVENTION

In view of the problems noted above, one object of the invention provides a camera which is capable of switching between two kinds of photographing modes, the normal photographing mode and the trimming photographing mode of enabling telephotographing in pseudo and includes a viewfinder capable of confirming the range of an image plane to be printed through the viewfinder in either photographing mode.

Further, another object of the invention is to provide a camera which is capable of switching between two kinds of photographing modes, the normal photographing mode and the trimming photographing mode of enabling telephotographing in pseudo, and switching and setting the photographing mode in an arbitrary position, and includes a viewfinder capable of changing the focal length of the viewfinder optical system so that the angle of view of the viewfinder according to the preset photographing mode matches the angle of view of a photo to be printed.

Still another object of the invention will be known from the detailed description of the invention with reference to the attached drawings.

DETAILED DESCRIPTION OF THE PREFERRED EMBODIMENTS

The embodiments of the invention will now be described.

[First Embodiment]

Figure 1:
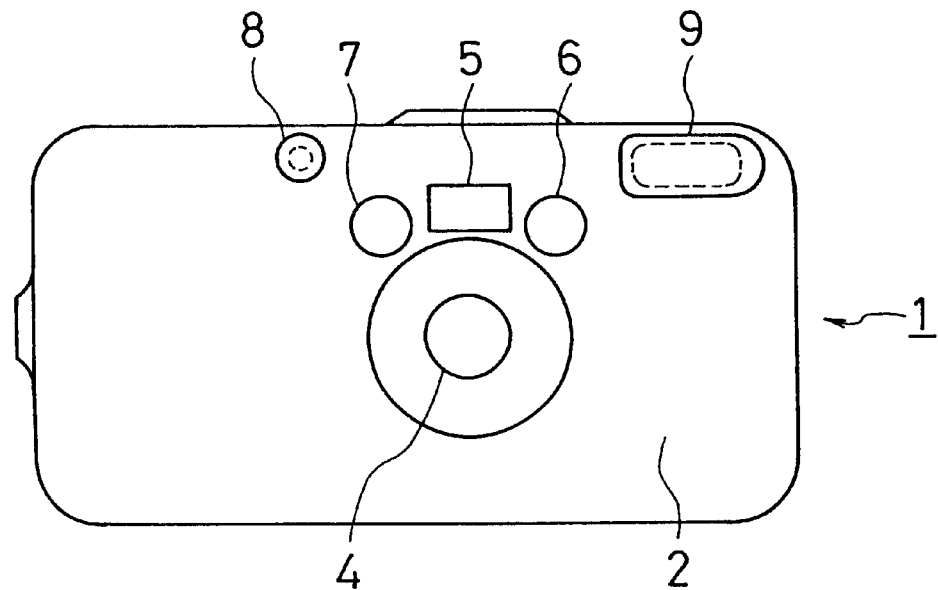
FIG. 1 is a front view showing the appearance of a first embodiment of a camera.
Figure 2:
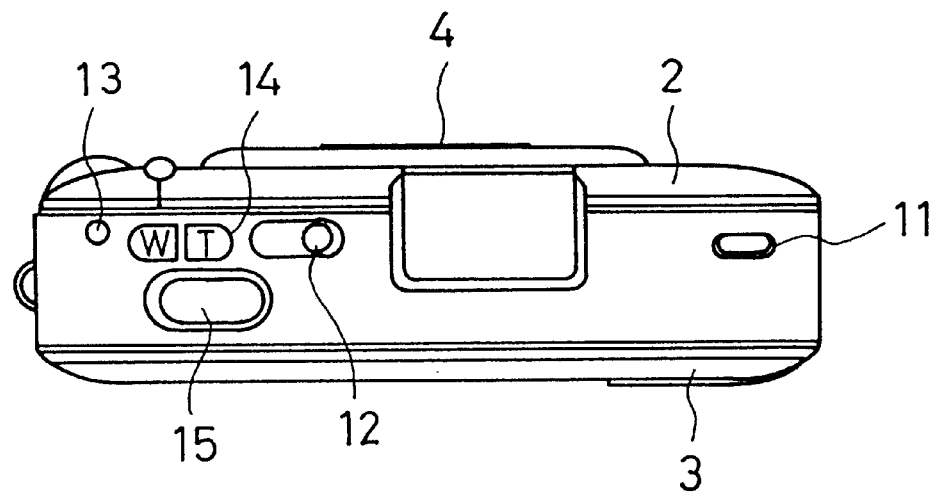
FIG. 2 is a top view showing the appearance of the camera shown in FIG. 1.

FIG. 1 is a front view showing the appearance of a camera according to the embodiment of the invention, and FIG. 2 is a top view of the camera. In FIGS. 1 and 2, the camera 1 is provided with a front panel 2 and a rear cover 3, and a zoom lens 4 constituting the photographing optical system is collapsibly arranged in the central area of the panel 2.

A zoom viewfinder 5 capable of changing the viewfinder magnification is disposed above the zoom lens 4, a projection window 6 and a photo detecting window 7 for measuring the object distance is disposed on the right side and left side, respectively thereof. The reference numeral 8 is a photometric part, and 9 is a flash light emitting part. The flash light emitting part 9 is disposed enough apart from the zoom lens 4 to prevent the occurrence of a red eye phenomenon (in the case of flash photographing, the eyes of a person as an object come out red)

A main switch 11, a trimming mode select/release switch 12, a rewind switch 13, a zoom switch 14 and a shutter release switch 15 are provided on the top of the camera 1. The trimming mode select/release switch 12 is a slide switch which can be slid right and left to switch between the trimming mode and the normal mode.

The outline of the operation will now be described. First, in the case of operating the trimming mode select/release switch 12 to set the normal mode, the magnification of the viewfinder corresponding to the normal mode is set.

In such a state, when the zoom switch 14 is operated, the zoom lens 4 constituting the photographing optical system and the viewfinder lens constituting the viewfinder optical system are driven, whereby the focal length of the zoom lens 4 is changed and the magnification of the zoom viewfinder 5 is changed interlocking therewith.

In the case of operating the trimming mode select/release switch 12 to select the trimming mode, only the viewfinder lens constituting the viewfinder optical system is driven to set the magnification of the viewfinder corresponding to the trimming magnification.

Further, in the condition where the trimming mode is set, when the zoom switch 14 is operated, the zoom lens 4 constituting the photographing optical system and the viewfinder lens constituting the viewfinder optical system are driven, whereby the focal length of the zoom lens 4 constituting the photographing optical system is changed, the magnification of the zoom viewfinder 5 is changed interlocking therewith, and the magnification of the viewfinder is changed within the range of focal length of the magnification corresponding to the trimming magnification as compared with the case of the normal mode.

Figure 3:
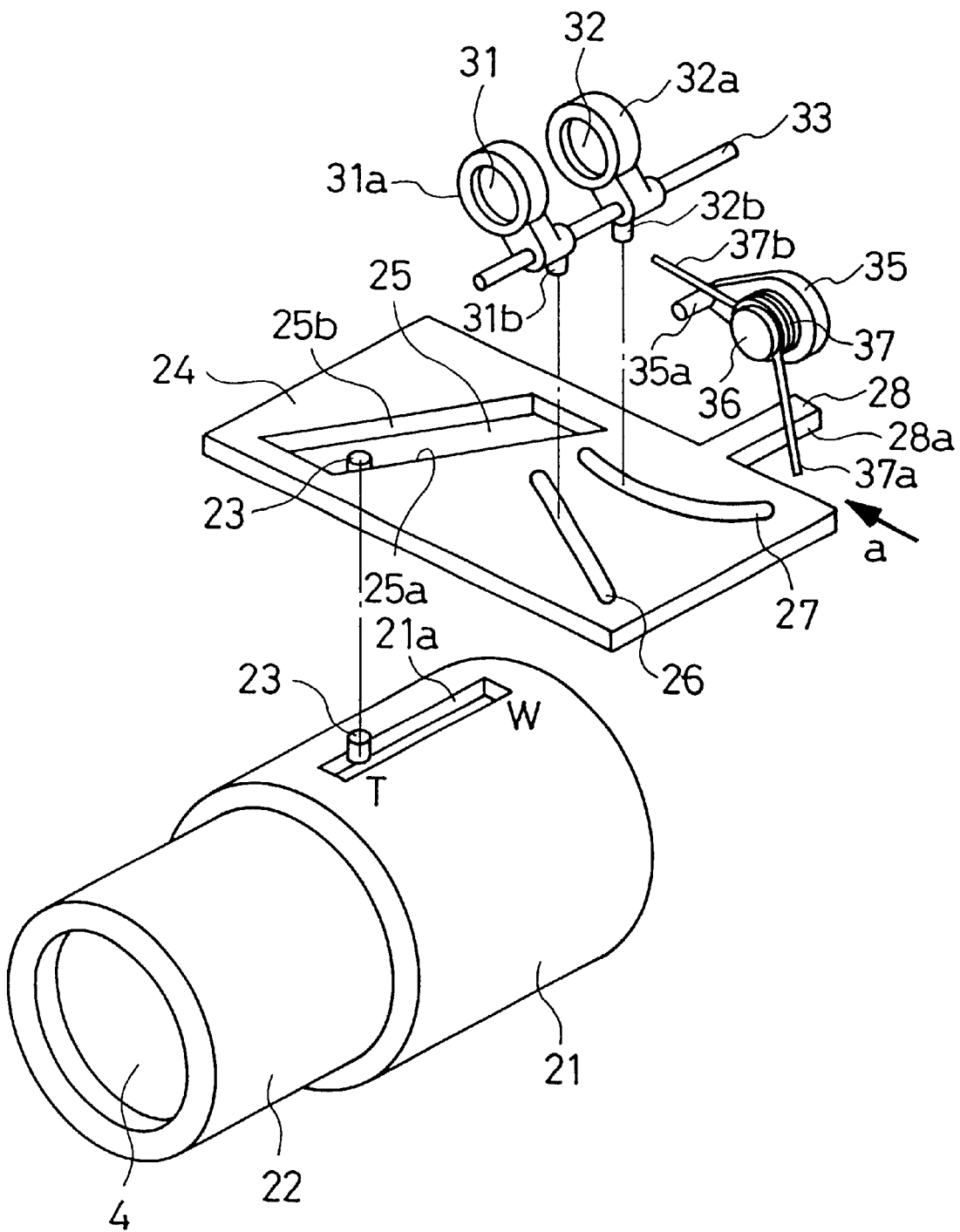
FIG. 3 is a perspective view showing the principal part of the configuration of a photographing optical system and a finder optical system (the condition where the normal mode is set)
Figure 4:
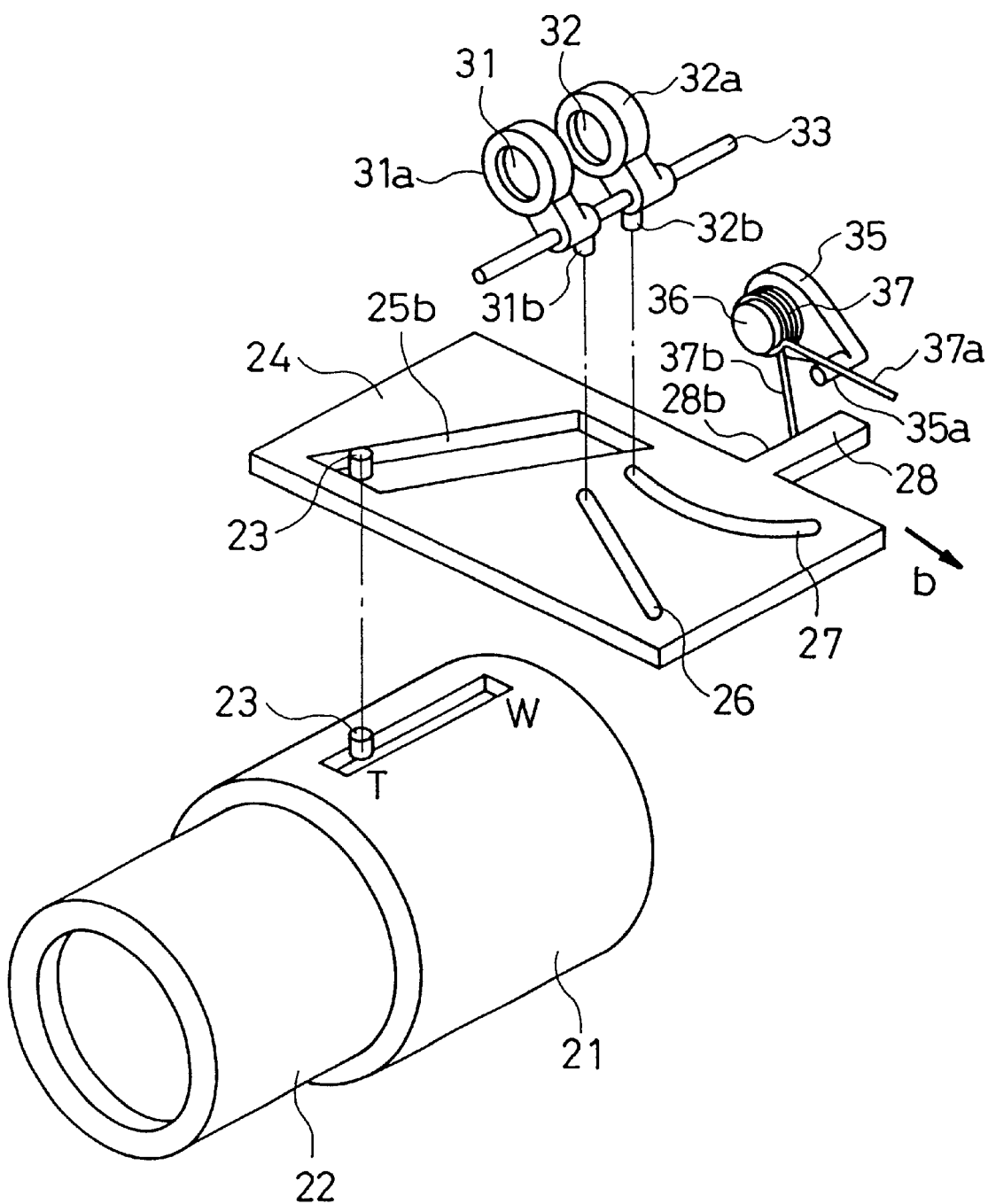
FIG. 4 is a perspective view showing the principal part of the configuration of the photographing optical system and the finder optical system (condition where the trimming mode is set)
Figure 5:
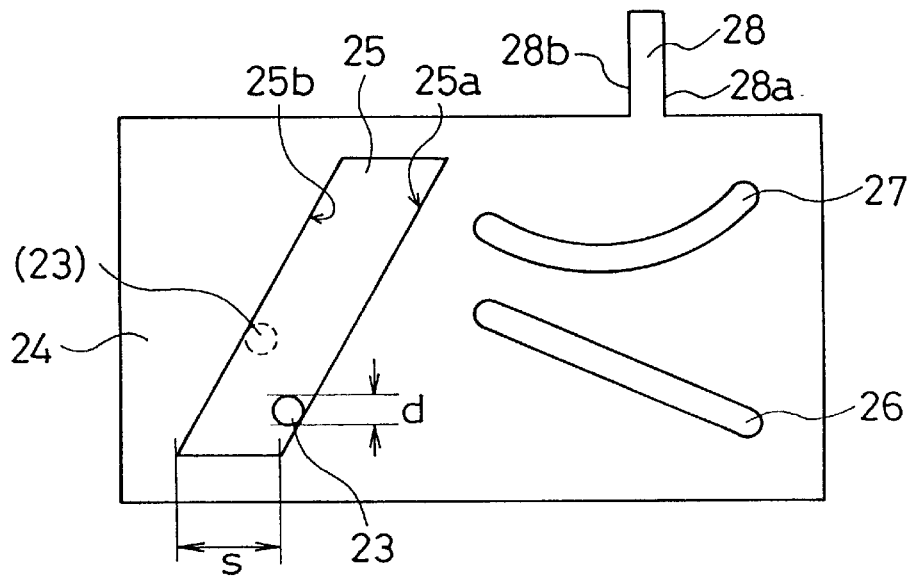
FIG. 5 is a plan view showing the shape of a viewfinder cam.

FIGS. 3 and 4 are perspective views showing the principal part of the configuration of the photographing optical system and the viewfinder optical system, FIG. 3 shows the case where the normal mode is set, and FIG. 4 shows the case where the trimming mode is set. FIG. 5 is a plan view of the viewfinder cam. The configuration of the photographing optical system and the viewfinder optical system will now be described with reference to FIGS. 3 to 5.

In FIGS. 3 and 4, the reference numeral 21 is a fixed lens barrel of the zoom lens constituting the photographing optical system, 22 is a movable lens barrel thereof, and the movable lens barrel 22 is provided with such a structure of a known zoom lens as to be moved in the fixed lens barrel by the zooming operation to change the focal length of the photographing lens in the inside thereof.

The reference numeral 23 is a driving member for driving a viewfinder cam 24, which is a pin planted in the movable lens barrel 22. The pin 23, which is the driving member, is projected from a slit 21a of the fixed lens barrel 21 and moved between the wide-angle side (W) and the telephoto side (T) by the movement of the movable lens barrel 22.

The viewfinder cam 24 is a cam shaped as shown in a plan view of FIG. 5 and provided with a cam groove 25 constituting a wide cam part engaged with the pin 23, cam grooves 26, 27 for driving the viewfinder lenses 31, 32 mentioned later, and a lever 28 engaged with a coil spring 37 for energizing the viewfinder cam in a designated direction.

The cam groove 25 constituting the wide cam part has a width S larger than the diameter (d) of the pin 23, and is provided with a first cam face 25a and a second cam face 25b. The pin 23 abuts on the first cam face 25a in the normal mode, abuts on the second cam face 25b in the trimming mode, and one of the cam faces is used according to the photographing mode. In the cam groove 25 constituting the wide cam part, a play part is formed between the first cam face 25a and the second cam face 25b.

The viewfinder lenses 31, 32 are respectively held by lens holding members 31a, 32a, and the lens holding members 31a, 32a are held to be freely moved forward and backward by a guide shaft 33. The projections 31b, 32b provided on the lens holding members 31a, 32a are respectively engaged with the cam grooves 26, 27.

When the focal length of the zoom lens 4 is changed by zooming operation so that the viewfinder cam 24 is moved, the projections 31b, 32b are moved along the cam grooves 26, 27, whereby the viewfinder lenses 31, 32 held by the lens holding members 31a, 32a are moved to set the magnification of the viewfinder corresponding to the focal length of the zoom lens 4.

As mentioned later, even when according to switching between the normal mode and the trimming mode, the viewfinder cam 24 is moved to the position corresponding to the selected photographing mode, the projections 31b, 32b are moved along the cam grooves 26, 27 so that the viewfinder lenses 31, 32 held by the lens holding members 31a, 32a are moved to switch the magnification of the viewfinder.

The reference numeral 35 is a switching lever for switching the energizing direction of the viewfinder cam 24, thereby switching the energizing direction of the viewfinder cam 24 according to switching between the normal mode and the trimming mode by the switch 12. The switching lever 35 is held in such a manner as to freely turn on the rotating shaft 36.

The switching lever 35 may be electrically driven. To be concrete, the switching lever 35 is driven by a motor. The switch 12 may be formed by a push switch, so that switching between the normal mode and the trimming mode may be performed with every pushing.

In the normal mode, the switching lever 35 is set in a position shown in FIG. 3. The end part 37a of the coil spring 37 wound round the rotating shaft 36 abuts on the side part 28a (right side in FIG. 3) of the lever 28 of the viewfinder cam 24, and the other end part 37b of the coil spring 37 abut on the pin 35a on the switching lever 35 to energize the viewfinder cam 24 in the direction of an arrow (a). At this time, the pin 23 on the movable lens barrel 22, as shown in FIG. 3, abuts on the first cam face 25a of the cam groove 25 of the viewfinder cam 24.

On the other hand, in the trimming mode, the switching lever 35 is set in a position-shown in FIG. 4. The end part 37b of the coil spring 37 wound round the rotating shaft 36 abuts on the side part 28b (left side in FIG. 4) of the lever 28 of the viewfinder cam 24, and the other end part 37a of the coil spring 37 abuts on the pin 35a on the switching lever 35 to energize the viewfinder cam 24 in the direction of an arrow (b) At this time, the pin 23 on the movable lens barrel 22, as shown in FIG. 4, abuts on the second cam face 25b of the cam groove 25 of the viewfinder cam 24.

FIG. 3 shows the condition where the photographing optical system is set at the end part of the telephoto side (T). In this condition, the magnification (angle of view) of the viewfinder optical system is normally set to the magnification (angle of view) of the normal mode. That is, since the viewfinder cam 24 is energized in the direction of the arrow (a) by the coil spring 37, the first cam face 25a is put in a position where to abut on the pin 23, and the projections 31b, 32b provided on the lens holding members 31a, 32a are also in the state of engaging with the cam grooves 26, 27. Thus, the viewfinder lenses 31, 32 are set to the magnification (angle of view) of the normal mode.

When the photographing optical system is moved from the telephoto side (T) to the wide-angle side (W) in such a condition, the pin 23 on the movable lens barrel 22 is also moved from the telephoto side (T) to the wide-angle side (W). The viewfinder cam 24 is energized in the direction of the arrow (a) by the coil spring 37 to keep the contact state between the pin 23 and the first cam face 25a of the viewfinder cam 24, so that with the movement of the pin 23 from the telephoto side (T) to the wide angle side (W) by zooming operation, the viewfinder cam 24 is moved in the direction of the arrow (a)

By the movement of the viewfinder 24 in the direction of the arrow (a), the projections 31b, 32b provided on the lens holding members 31a, 32a are also moved along the cam grooves 26, 27, whereby the magnification (angle of view) of the viewfinder optical system is changed to the magnification (angle of view) suitable to the magnification set in the zoom lens 4 of the photographing optical system.

FIG. 4 shows the condition where the photographing optical system is set at the end of the telephoto side (T) in the trimming mode. In such a condition, the magnification (angle of view) of the viewfinder optical system is set to the magnification (angle of view) of the trimming mode. That is, since with switching from photographing in the normal mode to photographing in the trimming mode, the viewfinder cam 24 is energized in the direction of the arrow (b) (opposite direction to the arrow (a)) by the coil spring 37, the second cam face 25b is moved in the direction of the arrow (b) to a position where to abut on the pin 23, that is, by the distance of the play part.

Since the projections 31b, 32b provided on the lens holding members 31a, 32a are in the state of engaging with the cam grooves 26, 27, the viewfinder cam 24 is moved in the direction of the arrow (b) so that the viewfinder lenses 31, 32 are set to the magnification (angle of view) of the trimming mode.

When the photographing optical system is moved from the telephoto side (T) to the wide-angle side (W) by zooming operation in such a condition, the pin 23 on the movable lens barrel 22 is also moved from the telephoto side (T) to the wide-angle side (W). The viewfinder cam 24 is energized in the direction of the arrow (b) by the coil spring 37 to keep the contact state between the pin 23 and the second cam face 25b of the viewfinder cam 24, so that with the movement of the pin 23 from the telephoto side (T) to the wide angle side (W) by zooming operation, the viewfinder cam 24 is moved in the opposite direction to the arrow (b).

By the movement of the viewfinder cam 24 in the opposite direction to the arrow (b),the projections 31b, 32b provided on the lens holding members 31a, 32a are also moved along the cam grooves 26, 27, whereby the magnification (angle of view) of the viewfinder optical system is changed to the magnification (angle of view) suitable to the magnification set by the trimming mode.

As the angle of view of a visual field through the viewfinder optical system substantially coincides with the angle of view of a printed photograph, the range in the printed photograph can be confirmed in the size of the visual field viewed through the viewfinder optical system.

Figure 6:
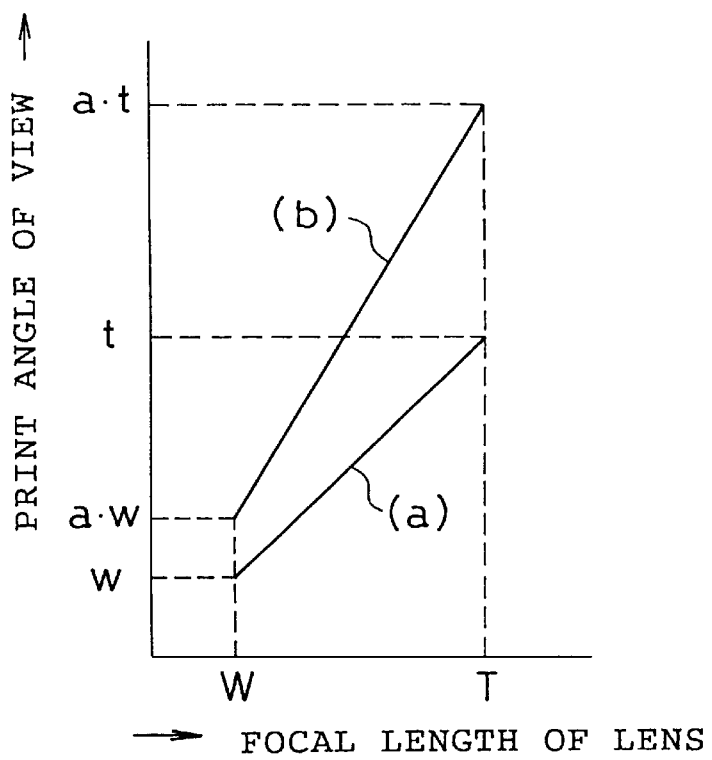
FIG. 6 is a diagram for explaining the relationship between the focal length set in the photographing optical system and the print angle of view in the first embodiment.

FIG. 6 is a diagram for explaining the relationship between the focal length set in the zoom lens of the photographing optical system and the angle of view of the printed photograph (hereinafter referred to as print angle of view).

A line (a) shows the relationship between the focal length of the photographing optical system and the print angle of view in the normal mode and a line (b) shows that in the trimming mode.

In the normal mode, in the case where the focal length of the zoom lens of the photographing optical system is a certain value on the wide angle side (W), the print angle of view is the angle (w) of view corresponding thereto, and in the case where the focal length of the photographing optical system is a certain value on the telephoto side (T), the print angle of view is the angle (t) of view corresponding thereto.

In the trimming mode, in the case where the focal length of the zoom lens of the photographing optical system is a certain value on the wide angle side (W), the print angle of view is the angle (a·w) taking into consideration the magnification (a) of the trimming mode, and in the case where the focal length of the zoom lens of the photographing optical system is a certain value on the telephoto side (T), the print angle of view is set to the angle of view (a·t) taking into consideration the magnification (a) of the trimming mode.

In printing, whether the entire of a photographed image plane is printed or the image plane is trimmed and printed is judged according to the trimming information recorded on a film simultaneously with date data in photographing. Recording of the trimming data on the film is performed by an LED not shown or the like, which is disposed in the vicinity of the photographing image frame. In addition to this, the data may be magnetically recorded on a magnetic strip provided on the film. The trimming data is information on the magnification (a) and in printing, trimming is performed in consideration of the magnification (a).

[Second Embodiment]

The second embodiment will now be described. Though the viewfinder cam for changing the angle of view of the viewfinder optical system is driven by the rectilinear motion of the zoom lens barrel constituting the photographing optical system in the first embodiment, the viewfinder cam for changing the angle of view of the viewfinder optical system is driven by the rotary motion of the zoom lens barrel constituting the photographing optical system in the second embodiment.

Figure 7:
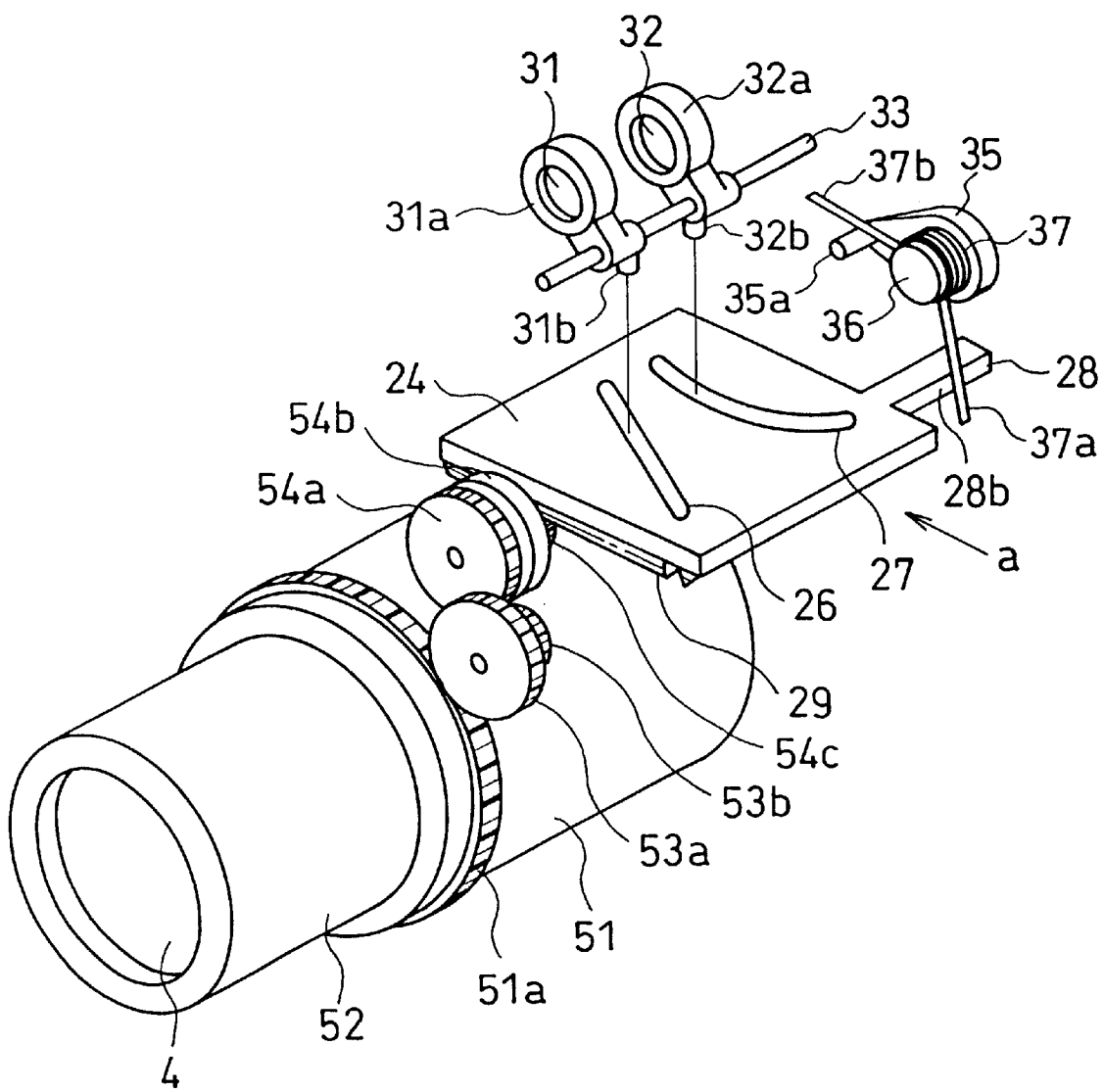
FIG. 7 is a perspective view showing the principal part of the configuration of the photographing optical system and the viewfinder optical system in a second embodiment of a camera (condition where the normal mode is set)
Figure 8A:
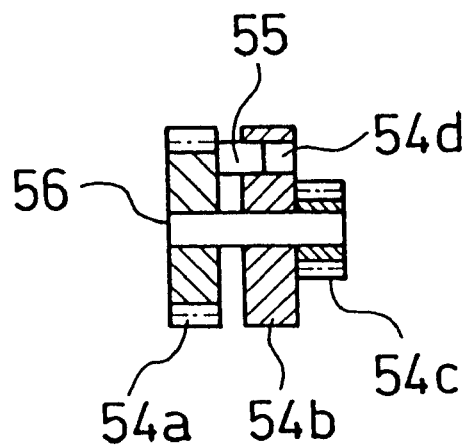
FIGS. 8(a) and 8(b) are diagrams showing the state of a gear mechanism in the second embodiment of the camera.
Figure 8B:
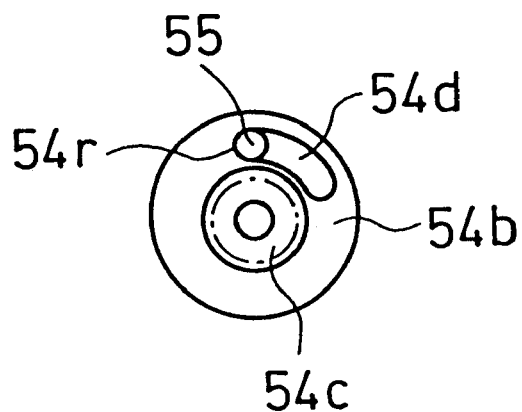
Figure 9:
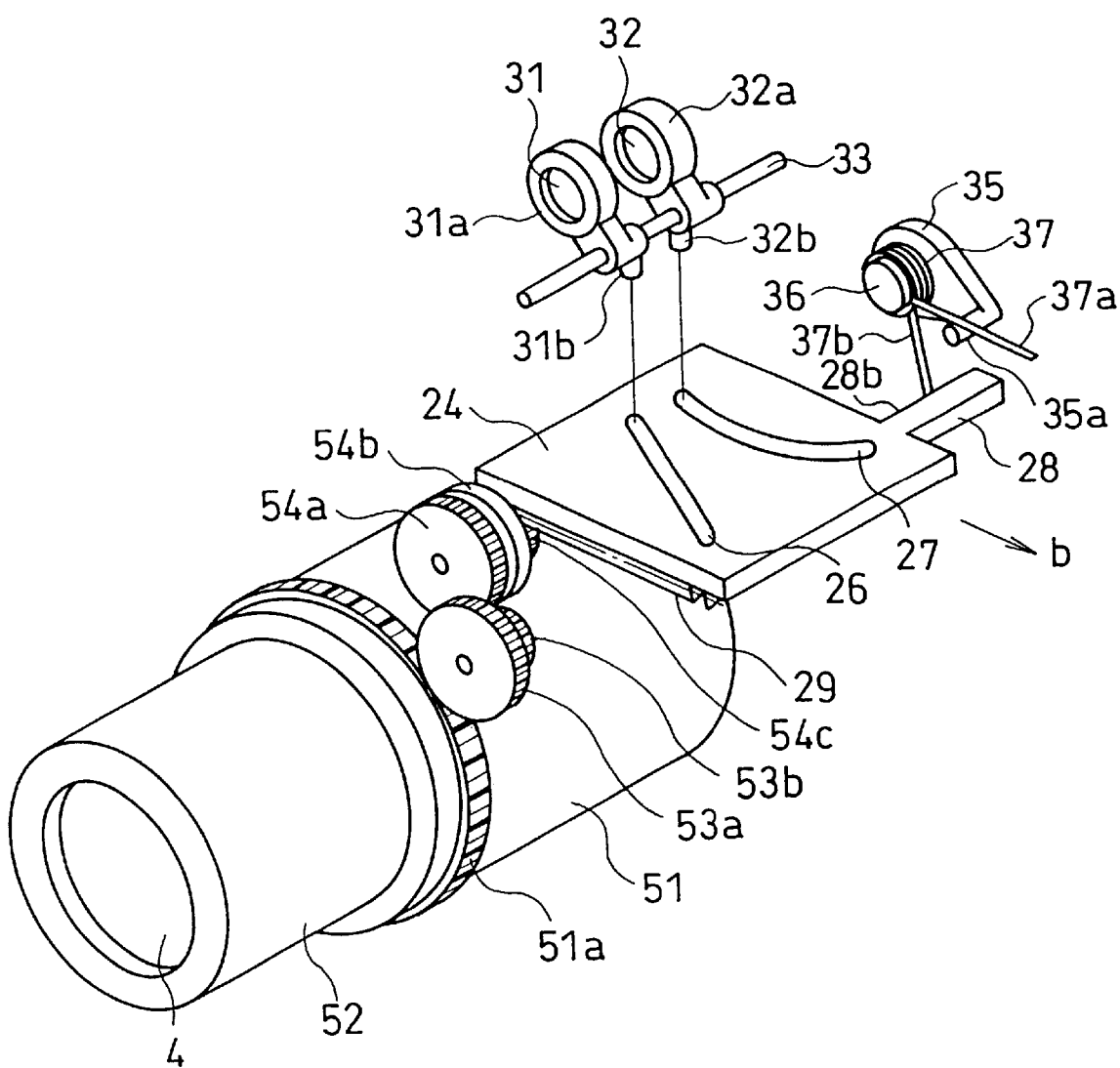
FIG. 9 is a perspective view showing the principal part of the configuration of the photographing optical system and the finder optical system in the second embodiment of the camera (condition where the trimming mode is set)
Figure 10A:
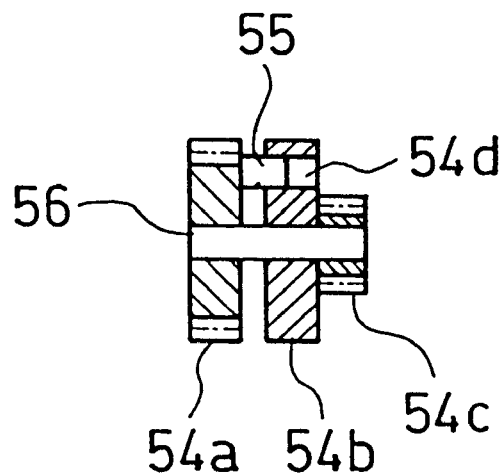
FIGS. 10(a) and 10(b) are diagrams showing the state of the gear mechanism in the second embodiment of the camera.
Figure 10B:
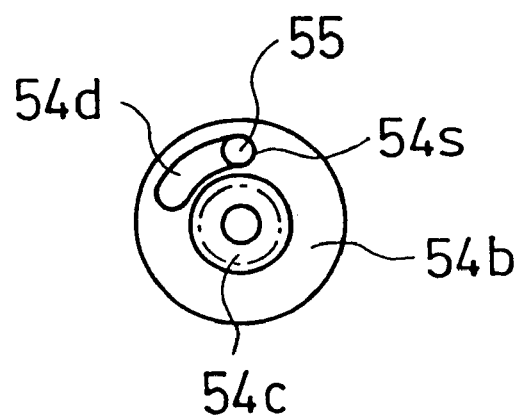

FIGS. 7 to 10 are diagrams for explaining the principal part of the configuration of the photographing optical system and the viewfinder optical system, FIG. 7 is a perspective view showing the configuration of the photographing optical system and the viewfinder optical system when the normal mode is set, FIGS. 8(a) and 8(b) are diagrams showing the condition of a gear mechanism arranged between the photographing optical system and the viewfinder optical system in the normal mode, FIG. 9 is a perspective view showing the configuration of the photographing optical system and the viewfinder optical system when the trimming mode is set, and FIGS. 10(a) and 10(b) are diagrams showing the condition of the gear mechanism arranged between the photographing optical system and the viewfinder optical system in the trimming mode.

According to the second embodiment, the viewfinder cam for changing the angle of view of the viewfinder optical system is driven by the rotary motion of the zoom lens barrel constituting the photographing optical system in the configuration of the first embodiment, and the configuration of the other parts is the same as that of the first embodiment, so in the following description, the same reference numerals designate the same members as those of the first embodiment and the detailed description is omitted.

In FIGS. 7 to 10, the reference numeral 51 is a zoom cam ring, 52 is a rectilinear lens barrel for holding the zoom lens 4, and the structure of a known zoom lens is provided inside the zoom cam ring 51 and the rectilinear lens barrel 52. In this arrangement, when the zoom cam ring 51 is rotated by the zooming operation, the rectilinear lens barrel 52 is moved to set a desired focal length in the zoom lens 4.

The zoom cam ring 51 is driven by a zoom motor which is a driving source not shown, and the rotation angle of the zoom cam ring 51 is detected by an encoder not shown to be used as the focal length information of the zoom lens 4.

The reference numeral 24 is a viewfinder cam for driving the viewfinder lenses 31, 32. A rack 29 is formed on the lower surface of the viewfinder cam 24.

On the other hand, a gear 51a is formed on the outside of the zoom cam ring 51, a gear mechanism comprising coaxial fixedly arranged gears 53a, 53b, a gear 54a meshing with the gear 53b, a cam 54b coaxially arranged on the gear 54a, and a gear 54c coaxially fixedly arranged on the cam 54b is disposed between the gear 51a and the rack 29, and the gear 54c meshes with the rack 29 of the lower surface of the viewfinder cam 24.

The rotation of the zoom cam ring 51 is transmitted to the viewfinder cam 24 by the gear mechanism, whereby the viewfinder lenses 31, 32 can be moved to change the magnification (angle of view) of the viewfinder.

FIG. 8(a) and FIG. 10(a) are sectional views showing the configuration of the gear 54a, the cam 54b and the gear 54c, and FIG. 8(b) and FIG. 10(b) are front views showing the shape of the cam 54b.

The gear 54a and the cam 54b are coaxially arranged on the shaft 56, and supported in such a manner as to freely relatively rotate about the shaft 56. The cam 54b and the gear 54c meshing with the rack 29 are coaxially arranged on the shaft 56, and the cam 54b and the gear 54c are integrally supported to be rotatable about the shaft 56, so that the rotation of the cam 54b is transmitted to the gear 54c. Further, a concentric circular-arc cam groove 54d is formed in the cam 54b, and a pin 55 planted in the gear 54a is engaged with the cam groove 54d.

By this arrangement, while the gear 54a is rotated, the pin 55 is just moved in the cam groove 54d and a play part where the rotation is not transmitted is formed in the cam 54b and the gear 54c.

When the zoom cam ring 51 is rotated by zooming operation, the rotation is transmitted through the gear 51a to the gear 53a and further transmitted to the gear 54a meshing with the gear 53b coaxially fixed to the gear 53a, but the play part formed in the cam 54b inhibits transmission of rotation to the gear 54c while the gear 54a is rotated through a designated angle. After the gear 54a is rotated through the designated angle, the rotation is transmitted to the gear 54c to drive the viewfinder cam 24.

Similarly to the configuration of the first embodiment, the viewfinder cam 24 is provided with cam grooves 26, 27 for driving viewfinder lenses 31, 32 and a lever 28 engaged with a coil spring for energizing the viewfinder cam in a designated direction, the viewfinder lenses 31, 32 are respectively held by the lens holding members 31a, 32a, and the projections 31b, 32b of the lens holding members 31a, 32a are respectively engaged with the cam grooves 26, 27.

A switching lever 35 for switching the energizing direction of the viewfinder cam 24 switches the energizing direction of the viewfinder cam 24 according to switching between the normal mode and the trimming mode by the switch 12. The switching lever 35 is held in such a manner as to freely rotate round the rotating shaft 36.

The switching lever 35 may be electrically driven. To be concrete, the switching lever 35 is driven by a motor. The switch 12 may be formed by a push switch, so that switching between the normal mode and the trimming mode may be performed with every pushing.

In the normal mode, the switching lever 35 is set in a position shown in FIG. 7. The end part 37a of the coil spring 37 wound round the rotating shaft 36 abuts on the side part 28a (right side in FIG. 7) of the lever 28 of the viewfinder cam 24, and the other end part 37b of the coil spring 37 abuts on the pin 35a on the switching lever 35 to energize the viewfinder cam 24 in the direction of an arrow (a).

In the trimming mode, the switching lever 35 is set in a position shown in FIG. 9. The endpart 37b of the coil spring 37 wound round the rotating shaft 36 abuts on the side part 28b (left side in FIG. 9) of the lever 28 of the viewfinder cam 24, and the other end part 37a of the coil spring 37 abuts on the pin 35a on the switching lever 35 to energize the viewfinder cam 24 in the direction of an arrow (b).

FIG. 7 shows the condition where the photographing optical system is set at the end of the telephoto side (T) in the normal mode. In such a condition, the magnification (angle of view) of the viewfinder optical system is set to the magnification (angle of view) of the normal mode. That is, since the viewfinder cam 24 is energized in the direction of the arrow (a) by the coil spring 37, the gear 54c of the gear mechanism is rotated through the rack 29, and the pin 55 is located at one end part 54r of the play part of the cam groove 54d (See FIG. 8(b)). At this time, the viewfinder lenses 31, 32 are set to the magnification (angle of view) of the normal mode.

In such a condition, the movement of the photographing optical system from the telephoto side (T) to the wide angle side (W) by zooming operation, that is, the rotation toward the wide angle side (W) of the zoom cam ring 51 is transmitted through the gears 51a, 53a, 53b, 54a, the pin 55 and the cam 54b to the gear 54c so that the viewfinder cam 24 is driven toward the wide angle side (W) (direction of the arrow (a))

By the movement of the viewfinder cam 24 in the direction of the arrow (a), the projections 31b, 32b provided on the lens holding member 31a, 32a are also moved along the cam grooves 26, 27, and the magnification (angle of view) of the viewfinder optical system is changed to the magnification (angle of view) suitable to the magnification set in the zoom lens 4 of the photographing optical system.

Secondly, when the trimming mode is set, and the switching lever 35 is set in a position shown in FIG. 9, the viewfinder cam 24 is moved in the direction of the arrow (b) by the operation of the coil spring 37 wound round the rotating shaft 36, so that the viewfinder lenses 31, 32 are set to the magnification (angle of view) of the trimming mode.

At this time, though the movement in the direction of the arrow (b) of the viewfinder cam 24 is transmitted through the rack 29 to the gear 54c and the cam 54b, the play part formed in the cam 54b inhibits transmission to the gear 54a, and the pin 55 abuts on the other end part (opposite end part to that in normal mode) 54s of the play part of the cam groove 54d (See FIG. 10 (b)). At this time, the viewfinder lenses 31, 32 are set to the magnification (angle of view) of the trimming mode. FIG. 9 shows the condition where the photographing optical system is set at the end part of the telephoto side (T).

In such a condition, the movement of the photographing optical system from the telephoto side (T) to the wide angle side (W) by zooming operation, that is, the rotation toward the wide angle side (W) of the zoom cam ring 51 is transmitted through the gears 51a, 53a, 53b, 54a, the pin 55 and the cam 54b to the gear 54c so that the viewfinder cam 24 is driven toward the wide angle side (W) (direction opposite to the arrow (b) i.e., direction of the arrow (a)).

By the movement of the viewfinder cam 24 in the direction of the arrow (a), the projections 31b, 32b provided on the lens holding member 31a, 32a are also moved along the cam grooves 26, 27, and the magnification (angle of view) of the viewfinder optical system is changed to the magnification (angle of view) suitable to the magnification set in the zoom lens 4 of the photographing optical system.

As the angle of view of a visual field through the viewfinder optical system substantially coincides with the angle of view of a printed photograph, the range in the printed photograph can be confirmed in the size of the visual field viewed through the viewfinder optical system.

[Third Embodiment]

In the first embodiment, when the zoom magnification becomes higher, an area where the ranges to be printed on the telephoto side in the normal mode and on the wide angle side in the trimming mode overlap each other is produced in some case.

Referring to FIG. 6, when the print angle of view ranges from the angle of view (a·w) to the angle of view (t), whether a photograph is taken in the normal mode or in the trimming mode, the prints of the same angle of view can be obtained.

In such a case, a print of a better image quality will be obtained by photographing in the normal mode. Then, in the third embodiment, photographing in the trimming mode is inhibited in the area where the ranges to be printed overlap.

Figure 11:
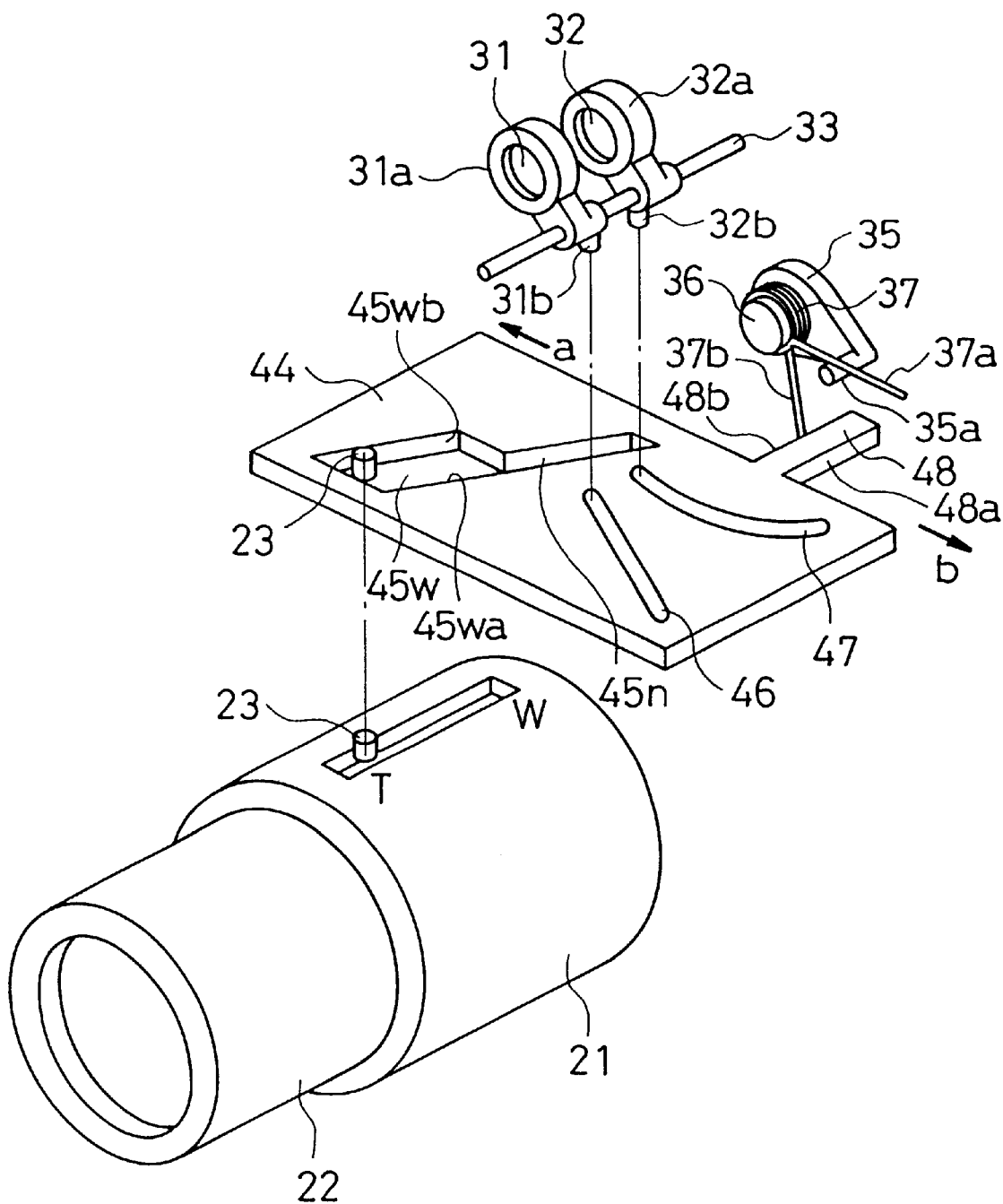
FIG. 11 is a perspective view showing the principal part of the configuration of the photographing optical system and the viewfinder optical system in a third embodiment of a camera (condition where the trimming mode is set)
Figure 12:
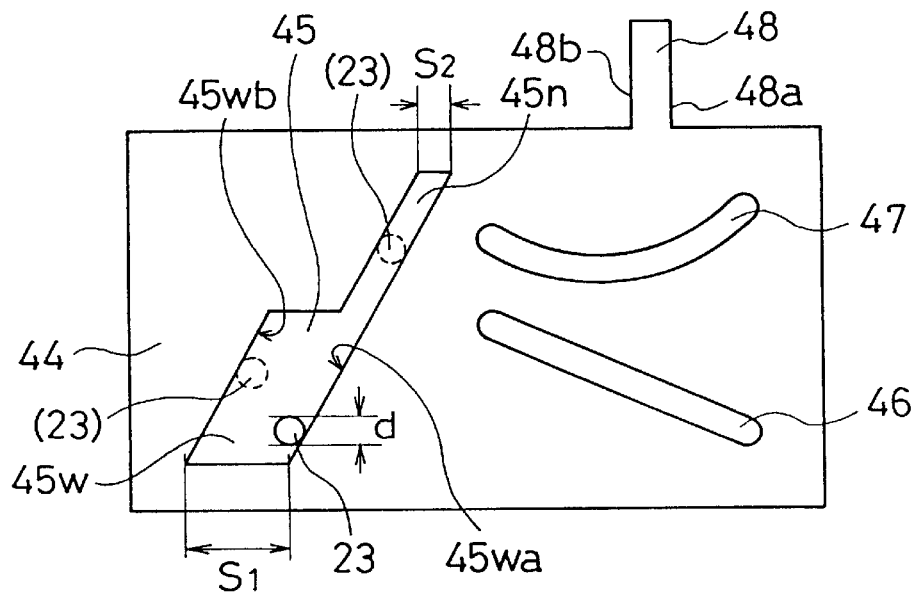
FIG. 12 is a plan view showing the shape of a viewfinder cam in the third embodiment of the camera.

FIG. 11 is a perspective view of the principal part of the configuration of the photographing optical system and the viewfinder optical system according to the third embodiment, which shows the case of the trimming mode. FIG. 12 is a plan view of a viewfinder cam.

The configuration of the photographing optical system and the viewfinder optical system of the third embodiment is such that the viewfinder cam 24 in the configuration of the first embodiment is replaced by a viewfinder cam 44, and the configuration of the other parts is the same as that of the first embodiment, so the same reference numerals as those of the first embodiment designate the same members and the detailed description is omitted.

The viewfinder cam 44 is provided with a cam groove 45 engaged with a pin 23, camgrooves 46, 47 for driving viewfinder lenses 31, 32, and a lever 48 engaged with a coil spring for energizing the viewfinder cam in a designated direction.

The cam groove 45 comprises a cam groove 45w constituting a wide cam part having a width S1 larger than the diameter (d) of the pin 23 and a cam groove 45n having a width S2 substantially matching the diameter (d) of the pin 23, and a cam groove 45w constituting the wide cam part includes a cam face 45wa and a cam face 45wb abutting on the pin 23.

The connection between the cam groove 45w constituting the wide cam part and the narrower cam groove 45n corresponds to the position where in the trimming mode, in the process of moving the photographing optical system from the telephoto side (T) to the wide angle side (W), the angle of view (pseudo angle of view) of the trimming mode becomes equal to the angle of view of the normal mode.

That is, the cam groove of the viewfinder cam is formed so that in the process of moving the photographing optical system from the telephoto side (T) to the wide angle side (W) in the trimming mode, when the angle of view becomes equal to the angle of view of the normal mode, thereafter the trimming mode is inhibited, and it is switched to the normal mode.

As mentioned later, in the range of the cam groove 45w constituting the wide cam part having a width S1 larger than the diameter (d) of the pin 23, the normal mode and the trimming mode can be set. In the range of the cam groove 45n substantially matching the diameter (d) of the pin 23, only the normal mode is set and setting of the trimming mode is inhibited.

Since the operation in the normal mode is the same as that of the first embodiment, the detailed description is omitted. The switching lever 35 is set in the same position as that shown in FIG. 3, the pin 35a is located on the left side of the rotating shaft 36, and one end 37a of the coil spring 37 presses the side part 48a (right side in FIG. 11) of the lever 48 of the viewfinder cam 44 to energize the viewfinder cam 44 in the direction of an arrow (a).

At this time, when the focal length of the photographing optical system is set at the end part of the telephoto side (T), the pin 23 on the movable lens barrel 22 abuts on the cam face 45wa of the cam groove 45 of the viewfinder cam 44 (See FIG. 11).

In the trimming mode, the switching lever 35 is set in a position shown in FIG. 11, the pin 35a is located on the right side of the rotating shaft 36, and one end 37b of the coil spring 37 presses the side part 48b (left side in FIG. 11) of the lever 48 of the viewfinder cam 44 to energize the viewfinder cam 44 in the direction of an arrow (b).

At this time, when the focal length of the photographing optical system is set at the end part of the telephoto side (T), the pin 23 on the movable lens barrel 22, as shown in FIG. 11, abuts on the cam face 45wb of the cam groove 45w of the viewfinder cam 44.

FIG. 11 shows the condition where the photographing optical system is set at the end part of the telephoto side (T) in the trimming mode. In such a condition, the magnification (angle of view) of the viewfinder optical system is set to the magnification (pseudo angle of view) of the trimming mode. That is, since the viewfinder cam 44 is energized in the direction of the arrow (b) by the coil spring 37, the viewfinder cam 44 is moved in the direction of the arrow (b) until the cam face 45wb abuts on the pin 23, and the projections 31b, 32b provided on the lens holding members 31a, 32a are also moved along the cam grooves 46, 47 so that the viewfinder lenses 31, 32 are set to the magnification (angle of view) of the trimming mode.

When the photographing optical system is moved from the telephoto side (T) to the wide-angle side (W) by zooming operation in such a condition, the pin 23 on the movable lens barrel 22 is also moved from the telephoto side (T) to the wide-angle side (W). As the viewfinder cam 44 is energized in the direction of the arrow (b) by the coil spring 37 to keep the contact state between the pin 23 and the cam face 45wb of the viewfinder cam 44, with the movement of the pin 23 from the telephoto side (T) to the wide angle side (W) by zooming operation, the viewfinder cam 44 is moved in the direction of the arrow (b).

By the movement in the direction of the arrow (b) of the viewfinder cam 44, the projections 31b, 32b provided on the lens holding members 31a, 32a are also moved along the cam grooves 46, 47, so that the magnification (angle of view) of the viewfinder optical system is changed to the magnification (angle of view) suitable to the magnification set by the trimming mode.

In the trimming mode, in the process of moving the photographing optical system from the telephoto side (T) to the wide angle side (W), when it reaches the position where the range (pseudo angle of view) to be printed overlaps the angle of view of the telephotograph end in the normal mode, the drive of the lens barrel is inhibited and the further trimming mode is inhibited.

Switching to the normal mode is conducted by the switching lever. At that time, to continuously change the angle of view, the photographing optical system may be moved to the end part of the telephoto side (T) with switching of the cam face.

Figure 13:
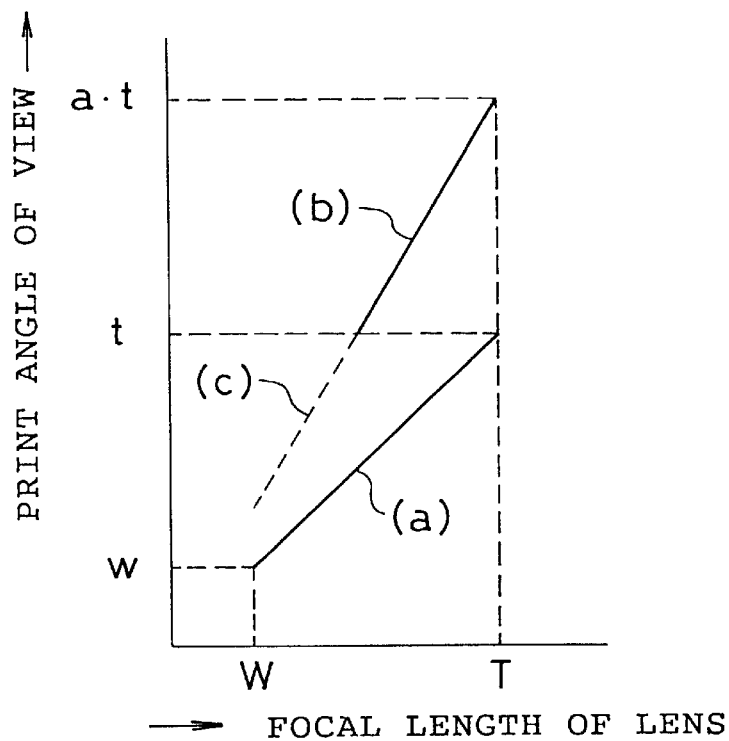
FIG. 13 is a diagram for explaining the relationship between the focal length set in the photographing optical system and the print angle of view in the third embodiment of the camera.

FIG. 13 is a diagram for explaining the relationship between the focal length set in the zoom lens of the photographing optical system of the third embodiment and the angle of view of a printed photograph (hereinafter referred to as print angle of view).

A line (a) shows the relationship between the focal length of the zoom lens of the photographing optical system and the print angle of view in the normal mode and a line (b) shows that in the trimming mode.

In the normal mode, in the case where the focal length of the zoom lens of the photographing optical system is a certain value on the wide angle side (W), the print angle of view also comes to the angle (w) of view corresponding thereto, and in the case where the focal length of the zoom lens of the photographing optical system is a certain value on the telephoto side (T), the print angle of view also comes to the angle (t) of view corresponding thereto.

In the trimming mode, in the case where the focal length of the zoom lens of the photographing optical system is a certain value on the telephoto side (T), the print angle of view comes to the angle of view (a·t) taking into consideration the magnification (a) of the trimming mode. In the range (indicated by a line (c)) where the range to be printed (pseudo angle of view) overlaps the angle of view of the normal mode, the trimming mode cannot be set.

It will be apparent as described above that according to the structure, switching from photographing in the normal mode to photographing in the trimming mode, or switching inversely, that is, the change of angle of view of the viewfinder according to the change of the photographing mode can be made without a converter lens to dispense with a special driving mechanism so that the viewfinder optical system can be arranged in a small size.

Further, according to the structure, to change the focal length of an objective lens according to the change of the photographing mode, the play part is provided between the variable power mechanism of the viewfinder optical system and the driving mechanism, and according to the selected photographing mode, the play part can be put to one side to change the angle of view of the viewfinder optical system according to the photographing mode, resulting in the remarkable advantages that the angle of view of the viewfinder optical system can be changed in an arbitrary focal length position of the zoom lens constituting the photographing optical system, that is, an arbitrary zoom position and that the operability is more excellent as compared with that of the conventional camera capable of trimming photographing.

What is claimed is:

1. A camera, comprising:
    a selector for selecting one mode from a first mode of photographing with recording of trimming information instructing to perform trimming in the print processing after photographing and a second mode of photographing without trimming information;
    a photographing optical system, the focal length of which is variable;
    a viewfinder optical system, the focal length of which is variable;
    a driving member adapted to work when the operation for changing the focal length of said photographing optical system is performed;
    a zoom mechanism which is capable of engaging with said driving member in a first state and in a second state, and is driven by said driving member to change the focal length of said viewfinder optical system; and
    a switching mechanism for operating said zoom mechanism without driving said driving member to perform a first state engagement when a first mode is selected, and operating said zoom mechanism without driving said driving member to perform a second state engagement when a second mode is selected.

2. A camera according to claim 1, wherein said camera further comprises a holding member for keeping said first state engagement and said second state engagement.

3. A camera according to claim 2, wherein said holding member includes an energizing member.

4. The camera according to claim 3, wherein the energizing direction of said energizing member varies depending on a mode to be selected from said first mode and said second mode.

5. A camera according to claim 1, wherein one of said driving member and said zoom mechanism includes an elongated groove, the other includes a projection engaged with said elongated groove, said projection abuts on the end part of said elongated groove in said first state, and said projection abuts on the other end part of said elongated groove in said second state.

6. A camera according to claim 1, wherein one of said driving member and said zoom mechanism includes a projection, the other includes a cam groove having a width larger than said projection, said projection abuts on one edge of said cam groove to drive said zoom mechanism in said first state, and said projection abuts on the other edge of said cam groove to drive said zoom mechanism in said second state.

7. A camera according to claim 1, wherein in photographing in said first mode and said second mode, said first mode is selected only in a zoom area where the range to be printed by print processing after photographing does not overlap.

8. A camera, comprising:

a selector for selecting one mode from a first mode of photographing with recording of trimming information instructing to perform trimming in the print processing after photographing and a second mode of photographing without trimming information;

a photographing optical system, the focal length of which is variable;

a viewfinder optical system, the focal length of which is variable;

a driving member adapted to work when the operation for changing the focal length of said photographing optical system is performed;

a zoom mechanism which is a mechanism for changing the focal length of said viewfinder optical system interlocking with said driving member and has a designated play part up to said driving member to the driving direction; and a switching mechanism for operating said zoom mechanism by the amount corresponding to said designated play part when switching from one mode of a first mode and a second mode to the other mode is instructed.

9. A camera according to claim 8, wherein said camera further includes a holding member for keeping interlocking of said driving member with said zoom mechanism.

10. A camera according to claim 9, wherein said holding member includes an energizing member.

11. A camera according to claim 10, wherein the energizing direction of said energizing member varies depending on a mode to be selected from said first mode and said second mode.

12. A camera according to claim 8, wherein one of said driving member and said zoom mechanism includes an elongated groove, the other includes a projection engaged with said elongated groove, and said play part is formed by said elongated groove.

13. A camera according to claim 8, wherein one of said driving member and said zoom mechanism includes a projection, the other includes a cam groove having a width larger than said projection, and said play part is formed by the width of said cam groove.

14. A camera according to claim 8, wherein in photographing in said first mode and in said second mode, said first mode is selected only in a zoom area where the range to be printed by print processing after photographing does not overlap.

* * * * *